(12) United States Patent
Boulay et al.

(10) Patent No.: US 6,498,565 B2
(45) Date of Patent: Dec. 24, 2002

(54) TWO WAY TRACKING SYSTEM AND METHOD USING AN EXISTING WIRELESS NETWORK

(75) Inventors: André Eric Boulay, Kirkland (CA); Robert Nelson, Hampstead (CA)

(73) Assignee: Boomerang Tracking, Inc., Quebec (CA)

( * ) Notice: Subject to any disclaimer, the term of this patent is extended or adjusted under 35 U.S.C. 154(b) by 0 days.

(21) Appl. No.: 09/777,796

(22) Filed: Feb. 6, 2001

(65) Prior Publication Data

US 2001/0040506 A1 Nov. 15, 2001

(30) Foreign Application Priority Data

Feb. 7, 2000 (CA) .............................................. 2298211

(51) Int. Cl.[7] .............................................. G08B 13/14
(52) U.S. Cl. .................... 340/572.1; 340/539; 340/991; 340/992; 340/426; 701/214; 701/209; 701/207; 455/442; 455/524; 455/436
(58) Field of Search .............................. 340/572.1, 539, 340/991, 992, 426; 701/214, 209, 207, 442; 455/524, 436

(56) References Cited

U.S. PATENT DOCUMENTS

| | | | |
|---|---|---|---|
| 5,055,851 A | * 10/1991 | Sheffer | 342/457 |
| 5,208,756 A | * 5/1993 | Song | 364/449 |
| 5,418,537 A | 5/1995 | Bird | 342/357 |
| 5,513,111 A | * 4/1996 | Wortham | 364/460 |
| 5,550,551 A | * 8/1996 | Alesio | 342/457 |
| 5,625,668 A | 4/1997 | Loomis et al. | 379/58 |
| 5,699,275 A | * 12/1997 | Beasley et al. | 364/514 R |
| 5,712,899 A | * 1/1998 | Pace, II | 379/58 |
| 5,808,564 A | * 9/1998 | Simms et al. | 340/990 |
| 5,815,538 A | * 9/1998 | Grell et al. | 375/356 |
| 5,895,436 A | 4/1999 | Savoie et al. | 701/214 |
| 5,914,675 A | * 6/1999 | Tognazzini | 340/989 |
| 5,918,180 A | 6/1999 | Dimino | 455/456 |
| 5,918,183 A | 6/1999 | Janky et al. | 455/550 |

* cited by examiner

Primary Examiner—Daniel J. Wu
Assistant Examiner—Tai T. Nguyen
(74) Attorney, Agent, or Firm—Merchant & Gould P.C.

(57) ABSTRACT

The present invention concerns a method and a system for tracking an object, person or animal, the object, person or animal being provided with a tracking wireless transceiver. The system includes a receiver for receiving an indication that the object, person or animal needs to be tracked; a wireless radio link for wirelessly communicating with the tracking wireless transceiver; a device for estimating coordinates of the object, person or animal based on a location of one or more sites communicating with the tracking wireless transceiver; and at least one wireless device provided with the object, person or animal, for wirelessly communicating with the tracking wireless transceiver. The present invention can be useful for communicating with the object, person or animal to be tracked, and is a more flexible system over the prior art systems.

44 Claims, 6 Drawing Sheets

TWO WAY TRACKING SYSTEM AND METHOD USING AN EXISTING WIRELESS NETWORK

FIELD OF THE INVENTION

The present invention relates to a two way tracking system and method for locating vehicles, objects, animals or humans that are provided with a wireless transceiver.

DESCRIPTION OF THE PRIOR ART

The present invention is an improvement over U.S. Pat. No. 5,895,436 to Savoie et al. That patent discloses a vehicle tracking method and system using the cellular network infrastructure. According to Savoie a cellular transceiver is installed in a vehicle which requires tracking, and operates on a continuously stand-by mode, to remain accessible to the cellular security provider. The cellular transceiver is turned on to an active mode when tracking of the vehicle is initiated. The general location of the stolen vehicle can be determined by paging the cellular transceiver located in the stolen vehicle to identify one or more cell sites located near the stolen vehicle. The information is then relayed to a tracking vehicle which makes use of a radio direction finder to obtain an accurate bearing on the location of the stolen vehicle. In another embodiment, the tracking vehicle which is provided with a radio direction finder can determine using a global positioning system receiver its location with respect to one or more cell sites identified as being close to the stolen vehicle such that the tracking vehicle can quickly travel to the area identified by the selected cell sites.

One of the main issues of that patent is conserving the integrity and security of the on-board system. In fact, the on-board system must be hidden from view, so as to prevent a potential thief from disarming the system.

SUMMARY OF THE INVENTION

One of the objects of the present invention is to provide a two-way tracking system similar to the one disclosed in U.S. Pat. No. 5,895,436, using an existing wireless network to locate a variety of objects, persons or animals.

According to the present invention, there is provided a system for tracking an object, person or animal, the object, person or animal being provided with a tracking wireless transceiver, comprising:
  receiver means for receiving an indication that the object, person or animal needs to be tracked;
  wireless radio means for wirelessly communicating with the tracking wireless transceiver;
  means for estimating coordinates of the object, person or animal based on a location of one or more sites communicating with the tracking wireless transceiver; and
  at least one wireless device provided with the object, person or animal, for wirelessly communicating with the tracking wireless transceiver.

According to another aspect the present invention, there is provided a system for tracking an object, person or animal, the object, person or animal being provided with a tracking wireless transceiver, comprising:
  receiver means for receiving an indication that the object, person or animal needs to be tracked;
  wireless radio means for wirelessly communicating with the tracking wireless transceiver; and
  means for estimating coordinates of the object, person or animal based on a location of one or more sites communicating with the tracking wireless transceiver, the improvement wherein:
  the wireless transceiver is further wirelessly in communication with at least one wireless device on the object, person or animal; and
  the wireless transceiver can be used to communicate with the at least one wireless device on the object, person or animal.

According to yet another aspect of the invention, there is provided a method for tracking an object, person or animal, the object, person or animal being provided with a tracking wireless transceiver, the method comprising the steps of:
  establishing a wireless communication with the wireless transceiver;
  estimating coordinates of the object, person or animal based on a location of one or more sites communicating with the wireless transceiver;
  receiving an indication that the object, person or animal needs to be tracked at the wireless transceiver; and
  sending a wireless signal from the wireless transceiver to at least one wireless device on the object, person or animal.

According to a further aspect of the invention, there is provided a method for tracking an object, person or animal, the object, person or animal being provided with a tracking wireless transceiver, the method comprising the steps of:
  establishing a wireless communication with the wireless transceiver;
  estimating coordinates of the object, person or animal based on a location of one or more sites communicating with the wireless transceiver;
  sending a wireless signal from the wireless transceiver to at least one wireless device on the object, person or animal; and
  determining that the object, person or animal needs to be tracked based on a response of the at least one wireless device received at the wireless transceiver.

BRIEF DESCRIPTION OF THE DRAWINGS

The present invention and its advantages will be more easily understood after reading the following non-restrictive description of preferred embodiments thereof, made with reference to the following drawings in which:

FIG. 4b is a diagram illustrating the location or direction finding GPS and transceiver antennae used with the system of FIG. 4a;

DETAILED DESCRIPTION OF THE PREFERRED EMBODIMENTS

Figure 1:
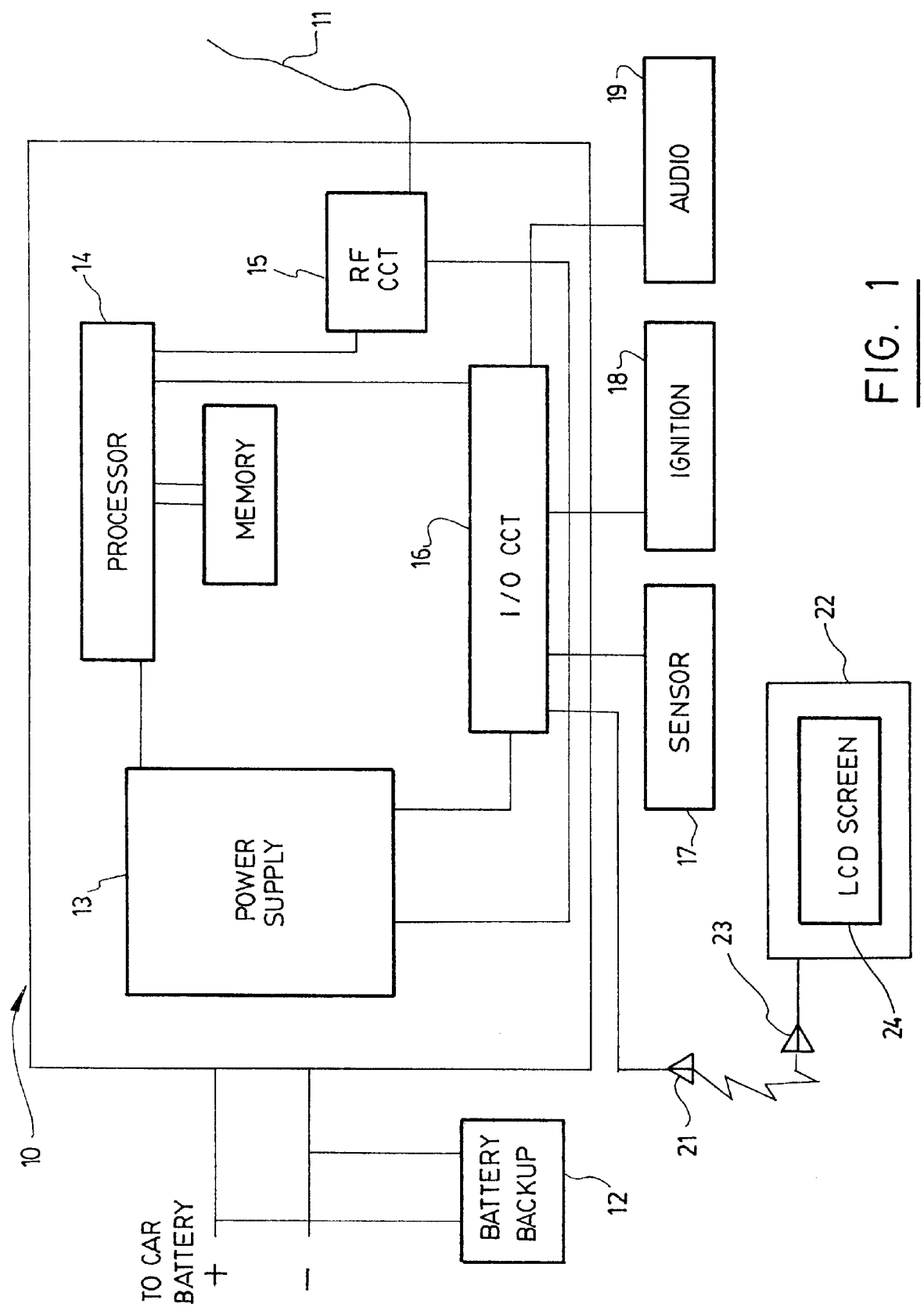
FIG. 1 is a block diagram of a tracking wireless transceiver with a wireless device according to the present invention.

Referring to FIG. 1, there is shown a block diagram of a tracking wireless transceiver 10. The wireless transceiver 10 illustrated is of the cellular type, but it should be understood by those skilled in the art that other types of wireless transceivers may be used and that the present description although giving examples of cellular transceivers, is not limited thereto. The wireless transceiver 10 can be installed in a vehicle 20 (shown in FIG. 2), but can also be worn by a person, an animal or be installed in or on almost any object.

In case the transceiver 10 is installed in the vehicle 20, it can be connected directly to a constant 12 volt power source, such as the car battery and may be provided with a back-up battery 32 to prevent the transceiver 10 from being disabled if the cables to the car battery are disconnected. The transceiver 10 is designed to operate full-time in a standby mode. The transceiver 10 is designed to draw a minimum amount of current such that it can be maintained in a standby mode continuously once installed. Similarly, even in an active mode, when the transceiver 10 is required to operate at higher transmit power, very little current will be drawn from the car battery. The transceiver 10 can be designed to operate in the same way as a standard telephone transceiver in that it will respond to queries from the cellular network at periodic intervals to provide the network with an indication of its operating status. The transceiver 10 will respond to standard commands and queries from the network such as when the RSSI level with respect to a particular cell site is required. It can also receive commands from the cellular network if the transceiver transmit power level needs to be changed, such as when the transceiver 10 is paged. The power level can vary from a minimum of 0.2 watts to a maximum of 0.6 watts such as is currently used in standard cellular telephones.

The transceiver 10 is provided with standard components, such as an antenna 11, a power supply 13, memory and processor circuits 14, RF circuit 15 and an IO circuit 16.

The IO 16 circuit is further connected to an second antenna 21 that allows wireless communication with a wireless device 22. The wireless device 22 has less components than the transceiver 10 and is therefore typically smaller in both size and weight. The wireless device 22 is further connected to an antenna 23 and can have an LCD or pixel screen 24. Furthermore, since the wireless device 22 is separate from the transceiver 10, it can be easily hidden, while the transceiver 10 can remain apparent to other people. A person that is to be tracked must be in proximity of both the transceiver 10 (which can be worn on a belt for example) and the wireless device 22 (which can be hidden in a pocket for example).

The IO circuit 16 can also be provided to connect a variety of sensors 17 to detect that an alarm has been triggered on the vehicle 20 or that the ignition 18 has been activated by an unauthorized user. Other options, such as, remote engine kill, car starter and remote door locks can also be used as well. The 10 circuit 16 can also be connected to an audio source 19 such as a microphone to enable the security service provider to hear any conversation persons might be having in the vehicle 20.

Figure 2:
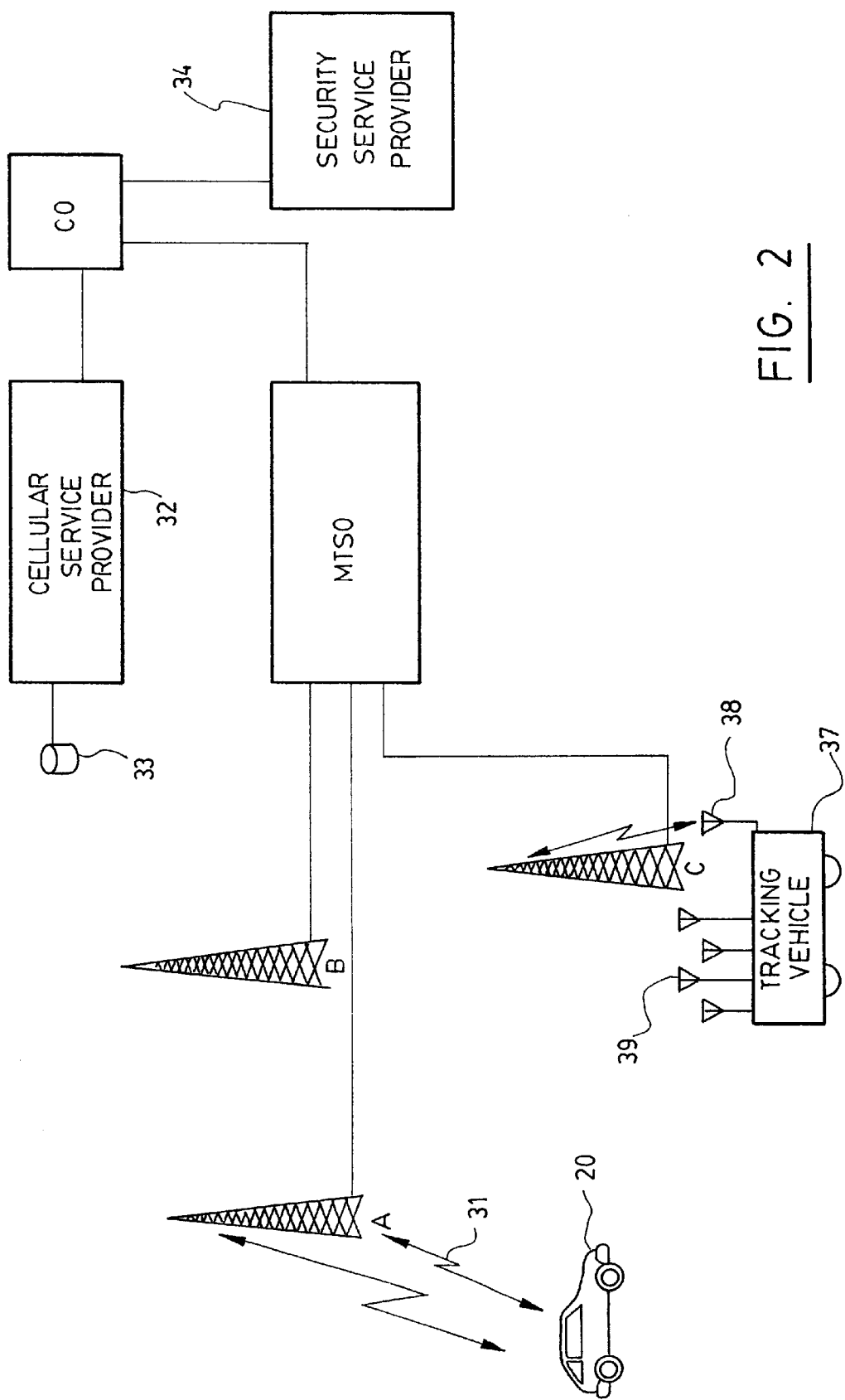
FIG. 2 is an illustration of the vehicle tracking system of the present invention.
Figure 3:
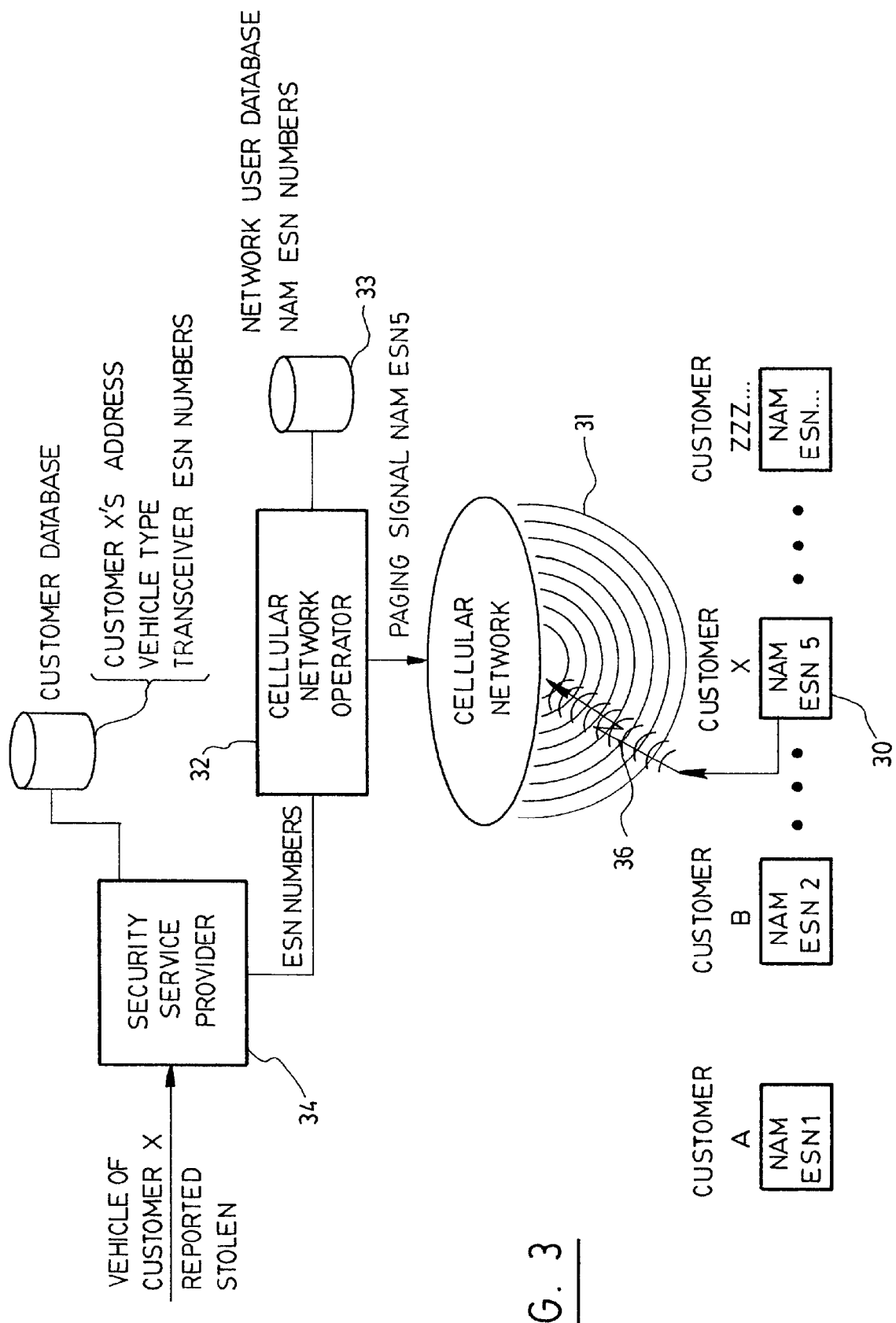
FIG. 3 is a diagram illustrating how a stolen vehicle or object can be tracked with a system of FIG. 2.

Referring now to FIGS. 2 and 3, there is shown a diagram illustrating a tracking system for tracking the transceiver 10. In this example, the transceiver 10 illustrated in FIG. 1 is installed in the vehicle 20. The transceiver 10 would be provided, as any other cellular telephone, with a unique identifier such as a MIN. The identity of the vehicle owner or operator and the transceiver's unique identifier are added to a customer database of the security service provider. The installation of the transceiver 10 and registration of the unique identifier would of course be done via a security service provider authorized by the cellular service provider to assign new cellular accounts, such as is currently done with the purchase of cellular phones.

Normally, when calls to and from a cellular transceiver are made, the cellular network will verify the cellular transceiver's 10-digit telephone number (NAM, Number Assigned Mobile) and ESN (Electronic Serial Number) before allowing the call to go through. Each cellular telephone is provided with a unique telephone number (MIN) which corresponds to a unique ESN.

With the system of the present invention, the transceiver 10 will provide its ESN when queried by the network. As will be described further below, only the transceiver having the correct ESN and MIN will respond to queries from the cellular network, even if each locating transceiver makes use of the same unique MINs.

Once the transceiver 10 is installed and in operation, the user becomes registered with the security service provider. The security provider enters the transceiver's ESN in a database with the customer's personal information, such as residential address, telephone number, vehicle description and serial number, etc. The transceiver 10 which is now in vehicle 20 operates in a passive or standby mode within the wireless network infrastructure. From time to time, at predetermined intervals, the transceiver 10 will be queried by the network to provide an indication of its location within the network. For example, in FIGS. 2 and 3, the transceiver 10 of vehicle 20 will be paged from time to time over a paging channel 31. The paging request is generated from any one of the cell sites A, B or C. Upon receiving the paging request, the transceiver 10 switches over to an active mode to transmit a response to the nearest cell site to identify amongst other things, the signal quality or RSSI level. This way, the service provider 32 can keep track of various cellular telephones within the network and their locations, such that when an incoming call arrives, the call can be directed to a cell site located nearest to the cellular telephone user. This information is updated from time to time in a database 33. The response may or may not be used by the network, according to the need to keep track of individual transceivers.

If a third party wishes to report that a person wearing the transceiver 10 needs to be tracked, then the third party can contact the security service provider 34 by making a call to a predetermined phone number. When the security service provider 34 receives the indication that transceiver 10 needs to be tracked. At this point, a preliminary query is made to determine the current location of the transceiver 10 within the network. A general estimate of the location of the transceiver 10 can be determined, say, within a 120 degree area of a cellular cluster, namely by identifying the cell site sector communicating with the transceiver 10. The security service provider dials the pre-selected telephone number, i.e. common NAM associated with tracking wireless transceivers. The call is processed as a normal incoming cellular call by the network operator. The cellular network operator receives the dialed digits, checks its database for the associated ESN, then transmits, on the cellular network, a new paging signal containing the common NAM and unique ESN of the transceiver 10. The only transceiver to respond will be the one associated with the vehicle 20 and a voice channel illustrated by arrow 36 is opened between the transceiver 10 of the vehicle 20 and a nearby cell site. This voice channel is kept open, as if a normal conversation was taking place. However, the security service provider is now in control of the opened voice channel and will keep it open until the transceiver 10 is located. In this example, cell site A is currently communicating with the transceiver over voice channel 36.

Furthermore, the concerned third party may wish to send a message to the person to be tracked through the wireless device 22 via the transceiver 10.

One way of sending messages in an inexpensive manner is to encode predetermined messages within the transceiver 10. The transceiver 10 is adapted to recognize which message to send based on, for example, the duration of call set up, i.e. the number of rings, without having the transceiver 10 actually answer the call. In the case where the transceiver 10 is a cellular (or PCS) unit, the person wishing to send a message would essentially first decide which message is to be sent. This message, in encoded form, is sent to the transceiver 10. The transceiver 10, based on the duration of the call set up, i.e. the number of rings, recognizes the message to be transmitted to the wireless device 22. The transceiver 10 then sends a wireless signal to the device 22 to display a given message. The message selector (not shown) in the transceiver 10 may be a circuit that is programmed to perform such a function. The advantage to this approach is that it does not require airtime (thus no fees), and the integrity of the transceiver 10 is maintained.

The wireless device 22 can be provided with a receiver (not shown) connected to the antenna 23 which receives the messages from the transceiver 10. Even though a LCD screen or display screen 24 has been shown, other types of interfaces may be connected to the receiver to generate a message indicating that the person is being tracked. For example, the interface may also be an audio interface. Furthermore, as described above, other messages types may be displayed on the interface of the wireless device 22.

Figure 5:
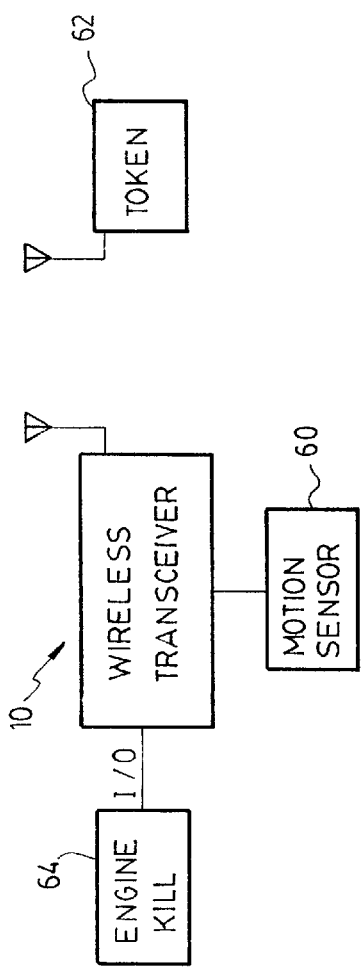
FIG. 5 is a schematic illustration of the wireless transceiver of the present invention operatively connected to a motion sensor and to an engine kill and in wireless communication with a token.

Referring to FIG. 5, the transceiver 10 can be provided with a motion sensor 60 installed on the vehicle 20. As soon as the motion sensor detects that the vehicle 20 is in motion, it sends a signal to the transceiver 10. The transceiver 10 then is adapted to send a signal to a token 62. The token 62, which can take the form of a circuit integrated on a key chain, for example, receives the signal from the transceiver 10 and modifies it in some way. The transceiver 10, detecting this modification of the sent signal, recognizes that the proper owner is in the vehicle 20. However, should the transceiver 10 not detect the modification of the sent signal, it could arm itself automatically and identify itself to a central location as being in need of being tracked. Alternatively, the transceiver 10 can also incorporate a feature such as engine kill 64, to prevent the vehicle 20 from travelling too far. Also alternatively, the transceiver 10 can be programmed to contact one or more predetermined numbers, such as a dispatcher, and to provide the end user with internet access, so as to contact the owner of the tracked item or parent of the person directly. It should be understood that in this embodiment, the invention is not limited to motion sensors, but is equally applicable to any type of sensor. Furthermore, the presence of a sensor is not essential, as a simple exchange between tokens and transceiver may be sufficient upon detecting a change such as starting the engine.

As can be appreciated, the system of the present invention can be armed or disarmed through the token 62 (or an automatic pulsing transmitter). Such a system protects the "stealthness" of the system, and minimizes the risks associated with a user not properly arming or disarming the system.

Figure 6:
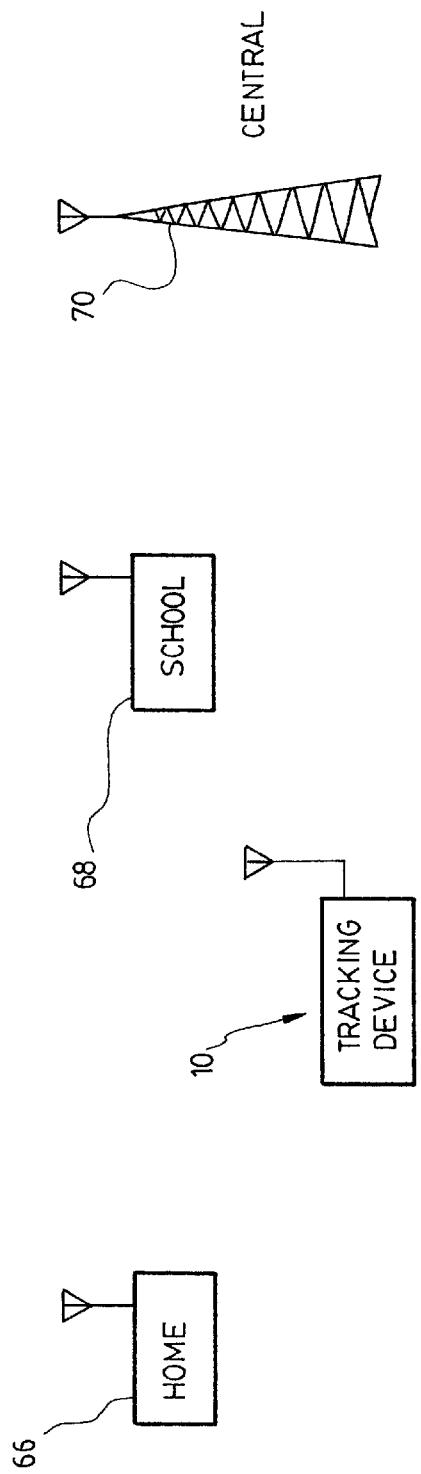
FIG. 6 is a schematic representation of the tracking device of the present invention where local emitters designated as home and school periodically transmit an ID to the tracking device, which is also in communication with a central location.

Referring to FIG. 6, the present system can be used to determine with precision where a person or object is. This is achieved by first having a user contact a central to register cell site, cell site sector and signal strength. Afterwards, definitive location confirmation is achieved by placing local emitters 66, 68 at specific locations, such as home, school, office, vehicle, etc. The local emitter sends its ID to the tracking device at predetermined intervals. The transceiver 10 has a receiver on board capable of determining which emitter is transmitting, and relaying this information back to the central 70, so that tracking can be effected. The central 70 is then able to determine that the tracking device is closer to school than to home.

Figure 4A:
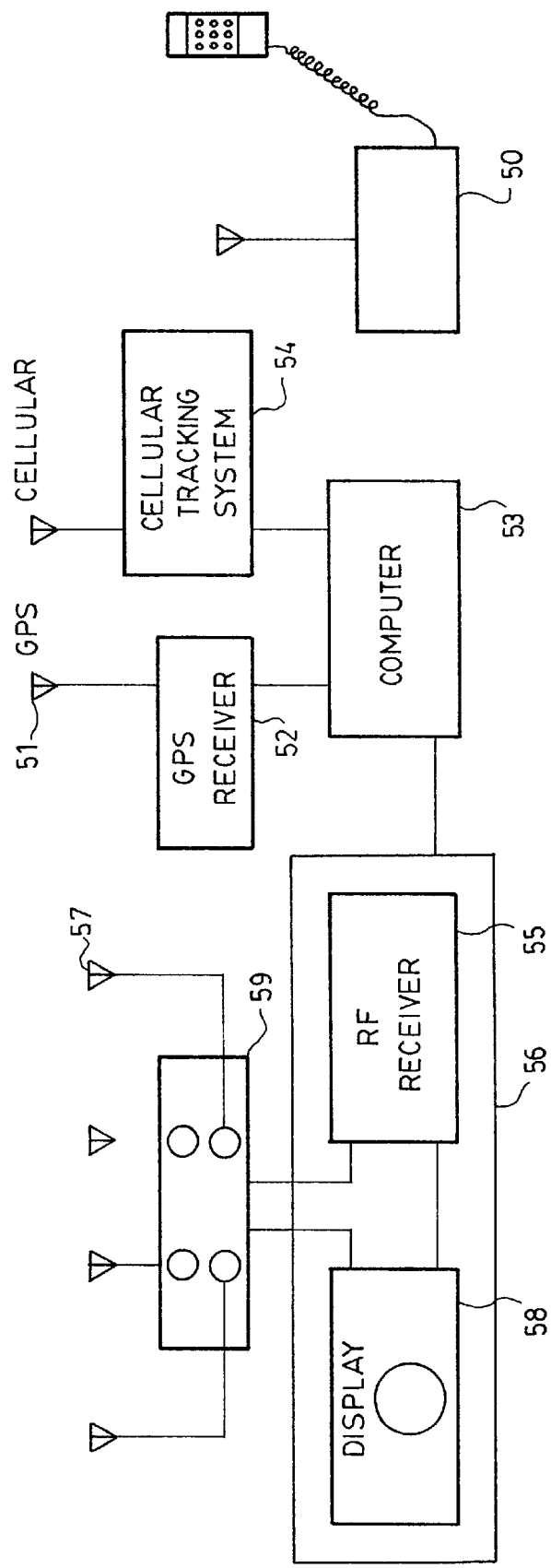
FIG. 4a is a block diagram of the vehicle tracking equipment provided on a search vehicle.
Figure 4B:
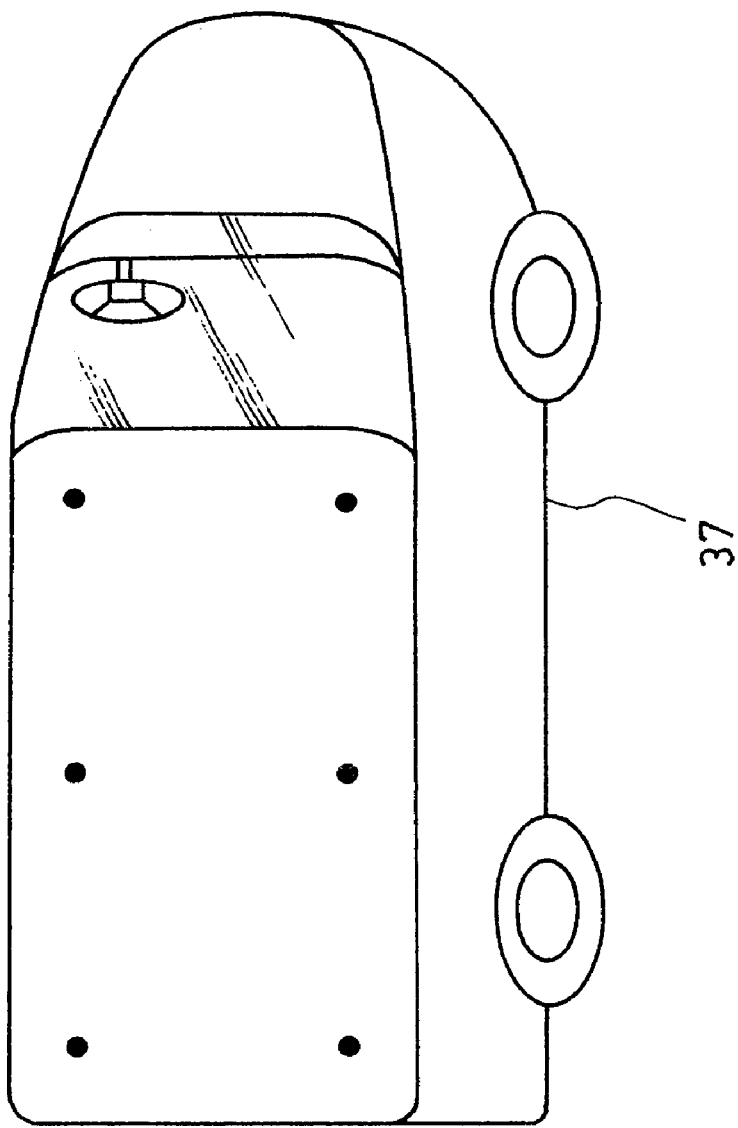

Furthermore, in order to precisely track the transceiver 10 of the vehicle 20, the security service provider 34 can forward the identity of the vehicle 20 to a security response team located in a tracking vehicle 37 (also shown in FIG. 4*b*). The team is provided with the current location of vehicle 20 based on the closest cell site sector where the vehicle is located. That information may either be provided by means of a building name or address, where the antenna cell site sector antenna is located, a street address, or in the preferred embodiment, by means of a latitude and longitude coordinates provided by a global positioning system. The GPS system is used by tracking vehicle 37 to establish its position with respect to the cell site sector that has been identified.

Once the identity and general location of the vehicle 10 is received at the tracking vehicle 37, the tracking vehicle 37 can monitor the open voice channel 36 and travel in the general direction identified by the security service provider. Once the tracking vehicle 37 reaches the general location of the vehicle 20, the security response team makes use of a radio direction finder which is tuned to the voice channel 36 to precisely identify the location of the vehicle 20. Once the precise location of the vehicle 20 has been confirmed, the security response team can alert the authorities to recover the vehicle 20.

The tracking vehicle 37 is provided with a cellular telephone system to communicate with the security service provider 34. The radio direction finder consists of a number of antennae 39 connected to radio direction finder equipment to locate precisely the direction of arrival of an RF signal emitted by the vehicle 20 on the voice channel 36 and received by cell site A as well as tracking vehicle 37.

Referring now to FIG. 4*a*, we have shown a block diagram of the tracking equipment which is provided in the tracking vehicle and which is used by the security response team to track the precise location of the vehicle 20. The equipment includes a standard cellular transceiver 50 which enables the security response team to communicate with the security service provider to coordinate the search and tracking of the vehicle. As indicated above, the vehicle may be provided with a GPS antenna 51 connected to a GPS receiver 52 and computer 53 to enable the operator to determine the location of the tracking vehicle 37 with respect to the coordinates of the cell site communicating with the vehicle. GPS receiver 52 will provide a direction the tracking vehicle should follow in order to reach the cell site. This is achieved by entering the coordinates of the cell site. The GPS receiver 52 can then provide an indication of the route to follow to the tracking vehicle which receives positioning data from a satellite via GPS antenna 51.

Once the tracking vehicle is dispatched and rolling towards the cell site serving or communicating with the cellular transceiver of the vehicle, the specialized cellular band RF receiver 55 locks onto the forward voice channel 31 (the frequency used to communicate from the tower to the cellular transceiver) currently in use based on the combination of ESN and NAM or a specified channel pointed out by the operators at the MTSO. The four quarter wave antenna of the radio direction finder 56 can then determine the direction of arrival of the RF signal emitted by the cellular tower. This provides the recovery team with a bearing towards the cell tower A (FIG. 2) if necessary. Once in the vicinity, the RF receiver is set to the reverse voice channel (the frequency used to communicate from the cellular transceiver to the tower) 31. This is done by dropping the frequency by exactly 45 Mhz on the tuner. The information provided by the quarter wave antennae 57 can then be used at a display or monitor 58 to determine the exact location of the stolen vehicle. As shown in FIG. 4b, the four quarter wave antennae are mounted at the corners of a square on the roof of a tracking vehicle 37. The output of each of the quarter wave antennae are fed into an antenna adder/coupler 59 and applied to the input of RF receiver 55. A radio direction finder such as described above is available from Doppler Systems Inc. The cellular tracking system as identified at reference numeral 54 is available from Allen Telecom Group Inc.

In the event that the tracking wireless transceiver is removed from the vehicle, one or multiple miniature wireless transceivers will be activated, at that time enabling the tracking vehicle to home it on the vehicle. This is important if the tracking wireless transceiver becomes defective or is removed by a thief. The miniature wireless transceivers essentially monitor the transmitter pulse sector of the tracker's device. If the miniature wireless transceiver does not detect the pulse of the transmitter in a predetermined length of time or detects a coded pulse from the transmitter within the tracking device, the miniature wireless transceiver begins sending its signal indicating a defective tracking wireless transceiver or a missing one.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

What is claimed is:

1. A system for tracking an object, person or animal, the object, person or animal being provided with a tracking wireless transceiver, comprising:
   receiver means for receiving an indication that the object, person or animal needs to be tracked;
   wireless radio means for wirelessly communicating with the tracking wireless transceiver;
   means for estimating coordinates of the object, person or animal based on a location of one or more sites communicating with the tracking wireless transceiver; and
   at least one wireless device provided with the object, person or animal, for wirelessly communicating with the tracking wireless transceiver;
   wherein the at least one wireless device includes:
       a receiver for receiving messages from the tracking wireless transceiver; and
       an interface connected to the receiver, for generating a message indicating that the object, person or animal is being tracked.

2. The system for tracking an object, person or animal according to claim 1, wherein the interface includes a display screen connected to the receiver, for displaying the message indicating that the object, person or animal is being tracked.

3. The system for tracking an object, person or animal according to claim 1, wherein the interface comprises an audio interface connected to the receiver, for playing the message indicating that the object, person or animal is being tracked.

4. The system for tracking an object, person or animal according to claim 1, further comprising a message selector means in the tracking wireless transceiver, for sending a predetermined message to the at least one wireless device based on a call set up duration of the tracking wireless transceiver.

5. The system for tracking an object, person or animal according to claim 1, further comprising:
   alerting means in the tracking wireless transceiver for automatically contacting a predetermined number if the receiver means receives the indication that the object, person or animal needs to be tracked.

6. A system for tracking an object, person or animal, the object, person or animal being provided with a tracking wireless transceiver, comprising:
   receiver means for receiving an indication that the object, person or animal needs to be tracked;
   wireless radio means for wirelessly communicating with the tracking wireless transceiver;
   means for estimating coordinates of the object, person or animal based on a location of one or more sites communicating with the tracking wireless transceiver; and
   at least one wireless device provided with the object, person or animal, for wirelessly communicating with the tracking wireless transceiver;
   and further comprising:
       a sensor connected to the tracking wireless transceiver, for detecting a change and sending a sensor signal to the tracking wireless transceiver; and
       a token included in the at least one wireless device, for receiving a signal from the tracking wireless transceiver if the sensor has detected the change, and transmitting a modified response signal to the tracking wireless transceiver.

7. The system for tracking an object, person or animal according to claim 6, wherein said sensor is a motion sensor.

8. The system for tracking an object, person or animal according to claim 7, further comprising:
   alerting means in the tracking wireless transceiver for sending the indication that the object, person or animal needs to be tracked to the receiver means if the modified response signal does not match an expected response signal.

9. The system for tracking an object, person or animal according to claim 7, further comprising:
   an engine kill connected to the tracking wireless transceiver, for shutting down an engine of the vehicle in response to a stopping signal sent by the tracking wireless transceiver if the modified response signal from the token is not received by the tracking wireless transceiver.

10. A system for tracking an object, person or animal, the object, person or animal being provided with a tracking wireless transceiver, comprising:
    receiver means for receiving an indication that the object, person or animal needs to be tracked;
    wireless radio means for wirelessly communicating with the tracking wireless transceiver;

means for estimating coordinates of the object, person or animal based on a location of one or more sites communicating with the tracking wireless transceiver; and at least one wireless device provided with the object, person or animal, for wirelessly communicating with the tracking wireless transceiver;

and further comprising:

local emitters included in the at the least one wireless device for wirelessly communicating with the tracking wireless transceiver; and a central location wirelessly communicating with the tracking wireless transceiver for determining which of the local emitters is closer to the tracking wireless transceiver.

11. A system for tracking an object, person or animal, the object, person or animal being provided with a tracking wireless transceiver, comprising:

receiver means for receiving an indication that the object, person or animal needs to be tracked;

wireless radio means for wirelessly communicating with the tracking wireless transceiver;

means for estimating coordinates of the object, person or animal based on a location of one or more sites communicating with the tracking wireless transceiver; and at least one wireless device provided with the object, person or animal, for wirelessly communicating with the tracking wireless transceiver;

and further comprising:

positioning means for determining a location of a search vehicle with respect to one or more sites;

radio means for monitoring RF signals emitted by the wireless transceiver and received at the search vehicle; and radio location finder means for tracking the object, person or animal based on a direction for travel of the RF signals emitted by the wireless transceiver and received at the search vehicle.

12. A system for tracking an object, person or animal, the object, person or animal being provided with a tracking wireless transceiver, comprising:

receiver means for receiving an indication that the object, person or animal needs to be tracked;

wireless radio means for wirelessly communicating with the tracking wireless transceiver; and means for estimating coordinates of the object, person or animal based on a location of one or more sites communicating with the tracking wireless transceiver, the improvement wherein:

the wireless transceiver is further wirelessly in communication with at least one wireless device on the object, person or animal; and the wireless transceiver can be used to communicate with the at least one wireless device on the object, person or animal wherein the at least one wireless device includes:

a receiver for receiving messages from the tracking wireless transceiver; and an interface connected to the receiver, for generating a message indicating that the object, person or animal is being tracked.

13. The system for tracking an object, person or animal according to claim 12, wherein the interface includes a display screen connected to the receiver, for displaying the message indicating that the object, person or animal is being tracked.

14. The system for tracking an object, person or animal according to claim 12, wherein the interface comprises an audio interface connected to the receiver, for playing the message indicating that the object, person or animal is being tracked.

15. The system for tracking an object, person or animal according to claim 12, further comprising a message selector means in the tracking wireless transceiver, for sending a predetermined message to the at least one wireless device based on a call set up duration of the tracking wireless transceiver.

16. The system for tracking an object, person or animal according to claim 12, further comprising:

alerting means in the tracking wireless transceiver for automatically contacting a predetermined number if the receiver means receives the indication that the object, person or animal needs to be tracked.

17. A system for tracking an object, person or animal, the object, person or animal being provided with a tracking wireless transceiver, comprising:

receiver means for receiving an indication that the object, person or animal needs to be tracked;

wireless radio means for wirelessly communicating with the tracking wireless transceiver; and means for estimating coordinates of the object, person or animal based on a location of one or more sites communicating with the tracking wireless transceiver, the improvement wherein:

the wireless transceiver is further wirelessly in communication with at least one wireless device on the object, person or animal; and the wireless transceiver can be used to communicate with the at least one wireless device on the object, person or animal;

and further comprising:

a sensor connected to the tracking wireless transceiver, for detecting a physical change and sending a sensor signal to the tracking wireless transceiver; and a token included in the at least one wireless device for receiving a signal from the tracking wireless transceiver if the sensor has detected the physical change, and transmitting a modified response signal to the tracking wireless transceiver.

18. The system for tracking an object, person or animal according to claim 17, wherein said sensor is a motion sensor.

19. The system for tracking an object, person or animal according to claim 18, further comprising:

an engine kill connected to the tracking wireless transceiver, for shutting down an engine of the vehicle in response to a stopping signal sent by the tracking wireless transceiver if the modified response signal from the token is not received by the tracking wireless transceiver.

20. A system for tracking an object, person or animal, the object, person or animal being provided with a tracking wireless transceiver, comprising:

receiver means for receiving an indication that the object, person or animal needs to be tracked;

wireless radio means for wirelessly communicating with the tracking wireless transceiver; and means for estimating coordinates of the object, person or animal based on a location of one or more sites communicating with the tracking wireless transceiver, the improvement wherein:

the wireless transceiver is further wirelessly in communication with at least one wireless device on the object, person or animal; and the wireless transceiver can be used to communicate with the at least one wireless device on the object, person or animal;

and further comprising:

local emitters included in the at least one wireless device for wirelessly communicating with the tracking wireless transceiver; and a central location wirelessly communicating with the tracking wireless transceiver for determining which of the local emitters is closer to the tracking wireless transceiver.

21. A system for tracking an object, person or animal, the object, person or animal being provided with a tracking wireless transceiver, comprising:

receiver means for receiving an indication that the object, person or animal needs to be tracked;

wireless radio means for wirelessly communicating with the tracking wireless transceiver; and wireless radio means for wirelessly communicating with the tracking wireless transceiver; and means for estimating coordinates of the object, person or animal based on a location of one or more sites communicating with the tracking wireless transceiver, the improvement wherein the wireless transceiver is further wirelessly in communication with at least one wireless device on the object, person or animal;

and further comprising:

positioning means for determining a location of a search vehicle with respect to the one or more sites;

radio means for monitoring RF signals emitted by the wireless transceiver and received at the search vehicle; and radio location finder means for tracking the object, person or animal based on a direction of travel of the RF signals emitted by the wireless transceiver and received at the search vehicle.

22. A method for tracking an object, person or animal, the object, person or animal being provided with a tracking wireless transceiver, the method comprising the steps of:

establishing a wireless communication with the wireless transceiver;

estimating coordinates of the object, person or animal based on a location of one or more sites communicating with the wireless transceiver;

receiving an indication that the object, person or animal needs to be tracked at the wireless transceiver; and sending a wireless signal from the wireless transceiver to at least one wireless device on the object, person or animal.

23. The method according to claim 22, further comprising the step of generating a message on the at least one wireless device indicating that the object, person or animal is being tracked.

24. The method according to claim 23, wherein the step of generating a message further comprises the step of displaying the message on a display screen.

25. The method according to claim 23, wherein the step of generating a message further comprises the step of playing the message through an audio interface.

26. The method according to claim 23, further comprising the step of sending predetermined messages to the at least one wireless device based on a call set up duration of the tracking wireless transceiver.

27. The method according to claim 22, further comprising the steps of:

sensing a change through a sensor connected to the tracking wireless transceiver;

sending a sensor signal to the tracking wireless transceiver;

receiving a signal at a token included in the at least one wireless device from the tracking wireless transceiver if the sensor has detected the change; and transmitting a modified response signal from the at least one wireless device to the tracking wireless transceiver.

28. The method according to claim 22, wherein the step of receiving an indication further comprises the step of automatically contacting a predetermined number.

29. The method according to claim 22, further comprising the steps of:

detecting a movement of a vehicle through a motion sensor connected to the tracking wireless transceiver;

sending a movement signal to the tracking wireless transceiver;

receiving a signal at a token included in the at least one wireless device from the tracking wireless transceiver if the motion sensor has detected movement of the vehicle; and transmitting a modified response signal from the at least one wireless device to the tracking wireless transceiver.

30. The method according to claim 29, further comprising the step of shutting down an engine of the vehicle in response to a stopping signal sent by the tracking wireless transceiver if the modified response signal is not received by the tracking wireless transceiver.

31. The method according to claim 22, further comprising the steps of:

wirelessly communicating with the tracking wireless transceiver through local emitters included in the at the least one wireless device; and determining which of the local emitters is closer to the tracking wireless transceiver.

32. The method according to claim 22, further comprising the steps of:

determining a location of a search vehicle with respect to the one or more sites;

monitoring the wireless communication from the search vehicle; and tracking the object, person or animal based on the direction of travel of RF signals emitted by the wireless transceiver and received at the search vehicle.

33. A method for tracking an object, person or animal, the object, person or animal being provided with a tracking wireless transceiver, the method comprising the steps of:

establishing a wireless communication with the wireless transceiver;

estimating coordinates of the object, person or animal based on a location of one or more sites communicating with the wireless transceiver;

sending a wireless signal from the wireless transceiver to at least one wireless device on the object, person or animal; and determining that the object, person or animal needs to be tracked based on a response of the at least one wireless device received at the wireless transceiver.

34. The method according to claim 33, further comprising the step of generating a message on the at least one wireless device indicating that the object, person or animal is being tracked.

35. The method according to claim 34, wherein the step of generating a message further comprises the step of displaying the message on a display screen.

36. The method according to claim 34, wherein the step of generating a message further comprises the step of playing the message through an audio interface.

37. The method according to claim 34, further comprising the step of sending predetermined messages to the at least one wireless device based on a call set up duration of the tracking wireless transceiver.

38. The method according to claim 33, further comprising the steps of:

sensing a physical change through a sensor connected to the tracking wireless transceiver;

sending a sensor signal to the tracking wireless transceiver;

receiving a signal at a token included in the at least one wireless device from the tracking wireless transceiver if the sensor has detected the physical change; and transmitting a modified response signal from the at least one wireless device to the tracking wireless transceiver.

39. The method according to claim 33, wherein the step of receiving an indication further comprises the step of automatically contacting a predetermined number.

40. The method according to claim 33, further comprising the steps of:

detecting a movement of a vehicle through a motion sensor connected to the tracking wireless transceiver;

sending a movement signal to the tracking wireless transceiver;

receiving a signal at a token included in the at least one wireless device from the tracking wireless transceiver if the motion sensor has detected movement of the vehicle; and transmitting a modified response signal from the at least one wireless device to the tracking wireless transceiver.

41. The method according to claim 40, further comprising the step of shutting down an engine of the vehicle in response to a stopping signal sent by the tracking wireless transceiver if the modified response signal is not received by the tracking wireless transceiver.

42. The method according to claim 33, further comprising the steps of:

wirelessly communicating with the tracking wireless transceiver through local emitters included in the at the least one wireless device; and determining which of the local emitters is closer to the tracking wireless transceiver.

43. The method according to claim 33, further comprising the steps of:

determining a location of a search vehicle with respect to the one or more sites;

monitoring the wireless communication from the search vehicle; and tracking the object, person or animal based on the direction of travel of RF signals emitted by the wireless transceiver and received at the search vehicle.

44. A system for tracking an object, person or animal, the object, person or animal being provided with a tracking wireless transceiver, comprising:

receiver means for receiving an indication that the object, person or animal needs to be tracked;

wireless radio means for wirelessly communicating with the tracking wireless transceiver;

means for estimating coordinates of the object, person or animal based on a location of one or more sites communicating with the tracking wireless transceiver; and at least one wireless device provided with the object, person or animal, for wirelessly communicating with the tracking wireless transceiver;

and further comprising:

a sensor connected to the wireless tracking transceiver for detecting a change and sending a sensor signal to the tracking wireless transceiver; and at least one automatic transmitter for receiving a signal from the tracking wireless transceiver if the sensor has detected the physical change, and for emitting a signal to the tracking wireless transmitter.

* * * * *